(12) United States Patent
You et al.

(10) Patent No.: US 10,362,565 B2
(45) Date of Patent: Jul. 23, 2019

(54) METHOD AND USER EQUIPMENT FOR TRANSMITTING UPLINK SIGNAL, AND METHOD AND BASE STATION FOR RECEIVING UPLINK SIGNAL

(71) Applicant: LG ELECTRONICS INC., Seoul (KR)

(72) Inventors: Hyangsun You, Seoul (KR); Kijun Kim, Seoul (KR); Soocheol Kyeong, Seoul (KR); Bonghoe Kim, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/636,985

(22) Filed: Jun. 29, 2017

(65) Prior Publication Data

US 2018/0007683 A1 Jan. 4, 2018

Related U.S. Application Data

(60) Provisional application No. 62/356,494, filed on Jun. 29, 2016.

(51) Int. Cl.
| | |
|---|---|
| *H04L 1/00* | (2006.01) |
| *H04L 1/18* | (2006.01) |
| *H04W 72/04* | (2009.01) |
| *H04W 88/02* | (2009.01) |
| *H04W 88/08* | (2009.01) |

(52) U.S. Cl.
CPC ....... *H04W 72/0413* (2013.01); *H04L 1/0009* (2013.01); *H04L 1/0067* (2013.01); *H04L 1/1819* (2013.01); *H04W 72/0466* (2013.01); *H04W 72/0446* (2013.01); *H04W 88/02* (2013.01); *H04W 88/08* (2013.01)

(58) Field of Classification Search
CPC ......... H04W 72/0413; H04W 72/0466; H04W 72/0446; H04W 88/02; H04W 88/08; H04L 1/0009; H04L 1/0067; H04L 1/1819
See application file for complete search history.

(56) References Cited

U.S. PATENT DOCUMENTS

| | | | |
|---|---|---|---|
| 2014/0192847 A1* | 7/2014 | Afkhami | H04L 27/2649 375/219 |
| 2017/0303159 A1* | 10/2017 | Ma | H04L 1/0001 |

* cited by examiner

*Primary Examiner* — Eric Myers
(74) *Attorney, Agent, or Firm* — Birch, Stewart, Kolasch & Birch, LLP

(57) ABSTRACT

Disclosed herein are a method and apparatus for transmitting/receiving an uplink signal. A user equipment receives information indicating a data transmission code rate for uplink data. The user equipment channel-codes the uplink data using a channel code corresponding to a channel code rate. The channel code rate is determined among a plurality of predefined channel code rates based on the data transmission code rate. The user equipment transmits the channel coded uplink data.

14 Claims, 10 Drawing Sheets

☐ : systematic bit    ⊞ : RV point
▨ : Parity 0          ▨ : Parity 1

METHOD AND USER EQUIPMENT FOR TRANSMITTING UPLINK SIGNAL, AND METHOD AND BASE STATION FOR RECEIVING UPLINK SIGNAL

CROSS-REFERENCE TO RELATED APPLICATIONS

This application claims the benefit of U.S. Provisional Application Ser. No. 62/356,494, filed on Jun. 29, 2016, the contents of which are all hereby incorporated by reference herein in their entirety.

TECHNICAL FIELD

The present invention relates to a wireless communication system, and more particularly, to a method and apparatus for transmitting/receiving uplink signals.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more and more communication devices require greater communication capacity, there is a need for improved mobile broadband communication over legacy radio access technology (RAT). In addition, massive machine type communication (mMTC) for connecting multiple devices and objects to each other to provide various services anytime and anywhere is one of the major issues to be considered in next generation communication.

There is also a discussion on communication systems to be designed in consideration of reliability and latency-sensitive services/UEs. Introduction of next generation radio access technology is being discussed in terms of improved mobile broadband communication (eMBB), mMTC, and ultra-reliable and low latency communication (URLLC).

TECHNICAL PROBLEM

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting receiving data occurring at a low frequency is required.

In addition, a system for transmitting/receiving signals in a system supporting a new radio access technology is required.

In addition, a channel coding scheme (e.g., low-density parity-check (LDPC) coding) to be applied to a new communication system and a method of applying the same need to be defined.

The technical objects that can be achieved through the present invention are not limited to what has been particularly described hereinabove and other technical objects not described herein will be more clearly understood by persons skilled in the art from the following detailed description.

SUMMARY

To achieve these objects and other advantages and in accordance with the purpose of the invention, as embodied and broadly described herein, provided herein is a method for transmitting an uplink signal by a user equipment in a wireless communication system. The method comprises: receiving, by the user equipment, information indicating a data transmission code rate for uplink data; channel-coding, by the user equipment, the uplink data using a channel code corresponding to a channel code rate; and transmitting, by the user equipment, the channel coded uplink data. The channel code rate is determined among a plurality of predefined channel code rates based on the data transmission code rate.

In another aspect of the present invention, provided herein is a user equipment for transmitting an uplink signal in a wireless communication system. The user equipment comprises a radio frequency (RF) unit, and a processor configured to control the RF unit. The processor controls the RF unit to receive information indicating a data transmission code rate for uplink data; channel-codes the uplink data using a channel code corresponding to a channel code rate;

and controls the RF unit to transmit the channel coded uplink data. The processor determines the channel code rate among a plurality of predefined channel code rates based on the data transmission code rate.

In another aspect of the present invention, provided herein is a method for receiving an uplink signal by a base station in a wireless communication system. The method comprises: transmitting, by the base station, information indicating a data transmission code rate for uplink data to a user equipment; receiving, by the base station, channel coded uplink data from the user equipment; and channel-decoding, by the base station, the channel coded uplink data into the uplink data using a channel code corresponding to a channel code rate. The channel code rate is determined among a plurality of predefined channel code rates based on the data transmission code rate.

In another aspect of the present invention, provided herein is a base station for receiving uplink signal in a wireless communication system. The base station comprises a radio frequency (RF) unit, and a processor configured to control the RF unit. The processor controls the RF unit to transmit information indicating a data transmission code rate for uplink data to a user equipment; channel-codes the uplink data using a channel code corresponding to a channel code rate; and controls the RF unit to transmit the channel coded uplink data. The channel code rate is determined among a plurality of predefined channel code rates based on the data transmission code rate.

In the respective aspects of the present invention, the plurality of predefined channel code rates may have a plurality of predefined channel codes, respectively. The channel code may be one of the plurality of predefined channel codes.

In the respective aspects of the present invention, the channel code rate may be a channel code rate closest to the data transmission code rate among the plurality of predefined channel code rates, a channel code rate closest to the data transmission code rate among channel code rates larger than the data transmission code rate, a channel code rate closest to a function value of the data transmission code rate among the plurality of predefined channel code rates, or a channel code rate of which function value is the closest one to a function value of the data transmission code rate among the plurality of predefined channel code rates.

In the respective aspects of the present invention, the user equipment may retransmit the uplink data having one of redundancy versions available for the channel code rate. The base station may order the user equipment to retransmit the uplink data having one of redundancy versions. The number of redundancy versions may be different according to channel code rates.

According to the present invention, uplink/downlink signals can be efficiently transmitted/received. Therefore, overall throughput of a radio communication system can be improved.

According to one embodiment of the present invention, a low cost/complexity UE can perform communication with a BS at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a base station may be reduce.

In addition, with development of smart devices, a small amount of data or data which are less frequently generated may be efficiently transmitted/received.

Signals may be transmitted/received in a system supporting a new radio access technology.

Additionally, a channel coding scheme (e.g., LDPC) different from a scheme of a legacy communication system can be efficiently applied in a new communication system.

According to an embodiment of the present invention, a small amount of data may be efficiently transmitted/received.

BRIEF DESCRIPTION OF THE DRAWING

The accompanying drawings, which are included to provide a further understanding of the invention, illustrate embodiments of the invention and together with the description serve to explain the principle of the invention.

DETAILED DESCRIPTION

Figure 1:
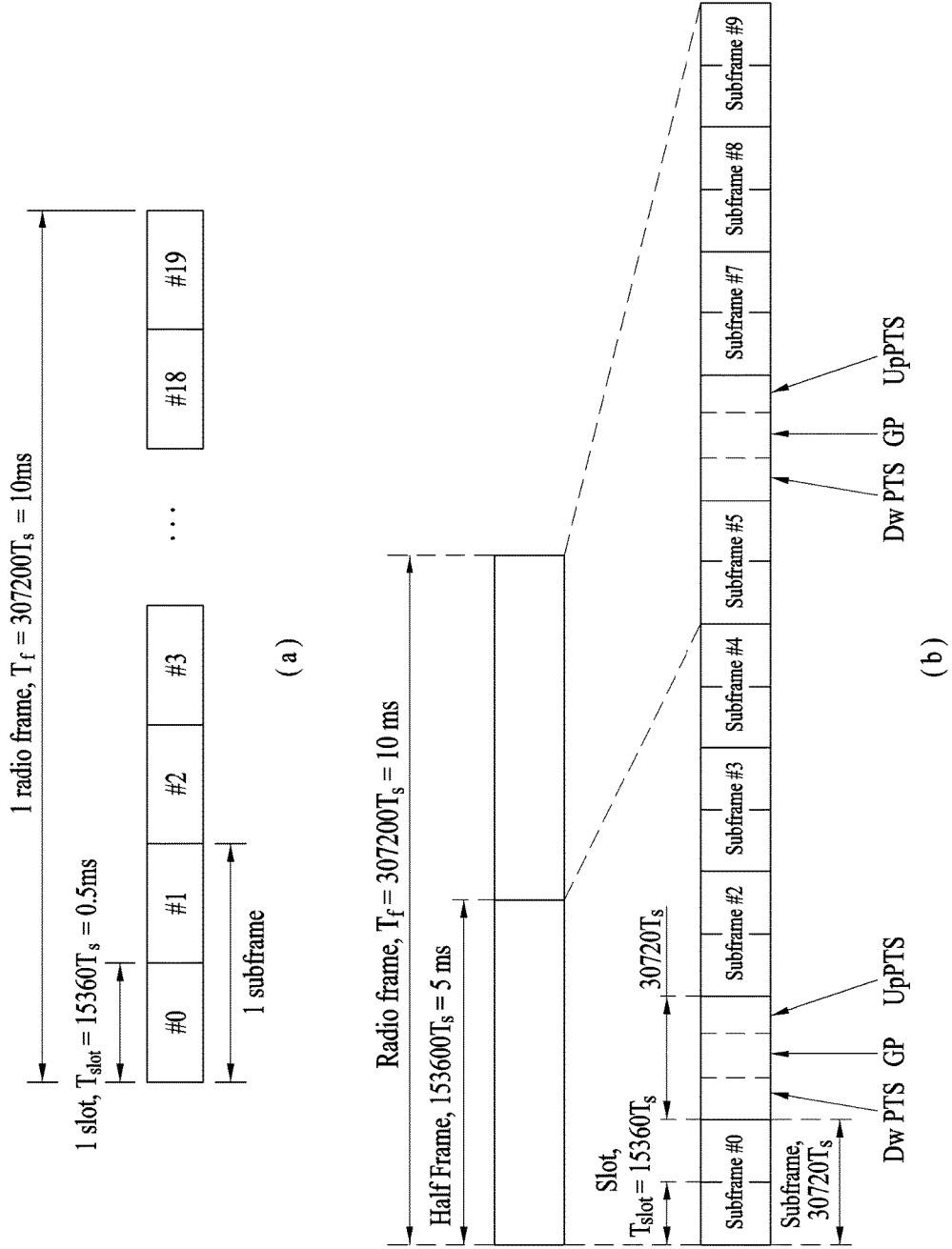
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Detailed CSI-RS configuration may be understood with reference to 3GPP TS 36.211 and 3GPP TS 36.331 documents.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For the terms and techniques which are used herein but not specifically described, the 3GPP LTE/LTE-A standard documents, for example, 3GPP TS 36.211, 3GPP TS 36.212, 3GPP TS 36.213, 3GPP TS 36.321 and 3GPP TS 36.331, and the like may be referenced.

FIG. 1 illustrates the structure of a radio frame used in a LTE/LTE-A based wireless communication system.

Specifically, FIG. 1($a$) illustrates an exemplary structure of a radio frame which can be used in frequency division multiplexing (FDD) in 3GPP LTE/LTE-A and FIG. 1($b$) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s$=1/(2048*15 kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

TTI refers to an interval during which data may be scheduled. For example, referring to FIGS. 1 and 3, in the current LTE/LTE-A system, a opportunity of transmission of an UL grant or a DL grant is present every 1 ms, and the UL/DL grant opportunity does not exists several times in less than 1 ms. Therefore, the TTI in the current LTE/LTE-A system is 1 ms.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Figure 2:
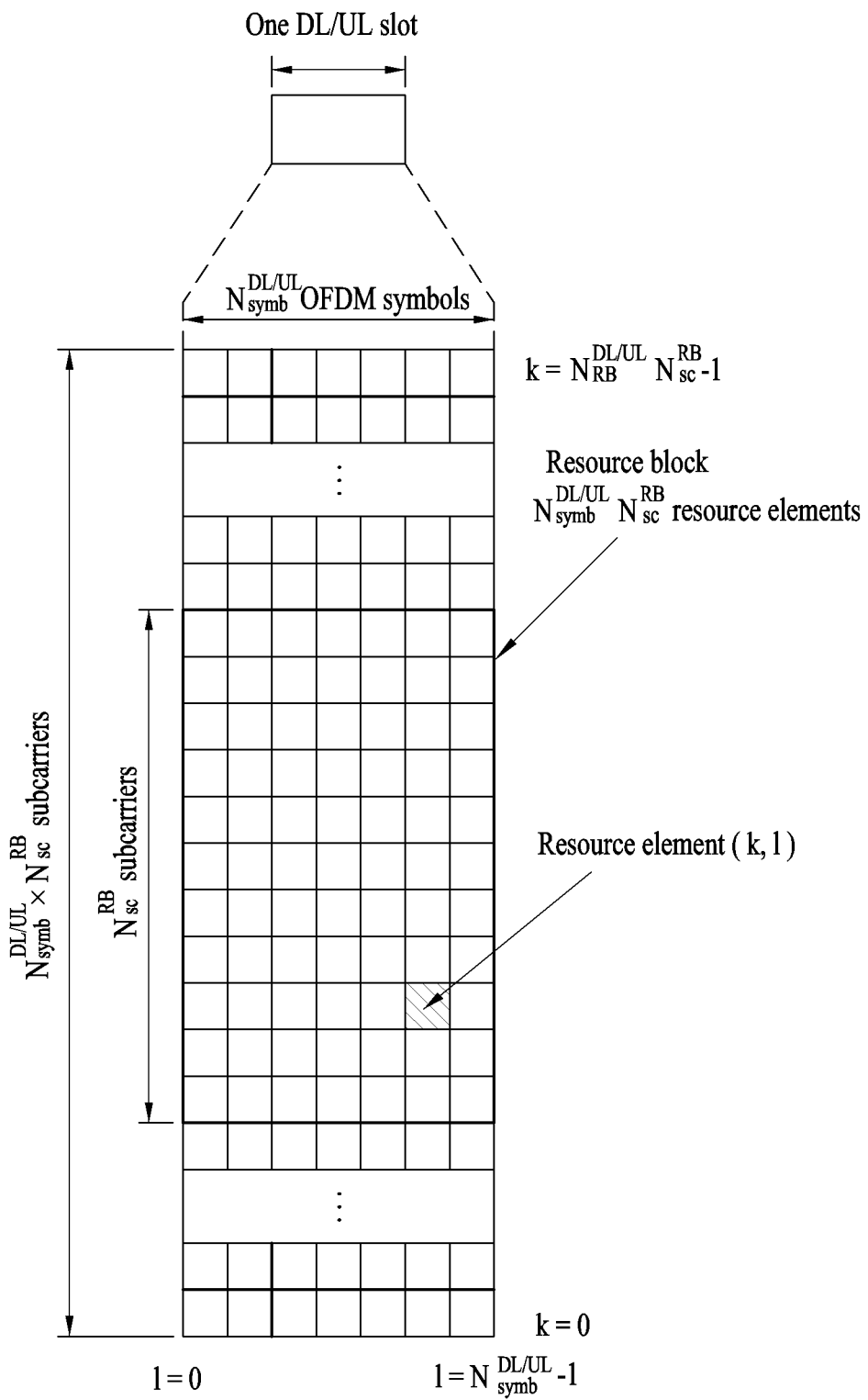
FIG. 2 illustrates the structure of a downlink (DL)/uplink (UL) slot in a wireless communication system.

FIG. 2 illustrates the structure of a DL/UL slot structure in a LTE/LTE-A based wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N_{UL}^{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
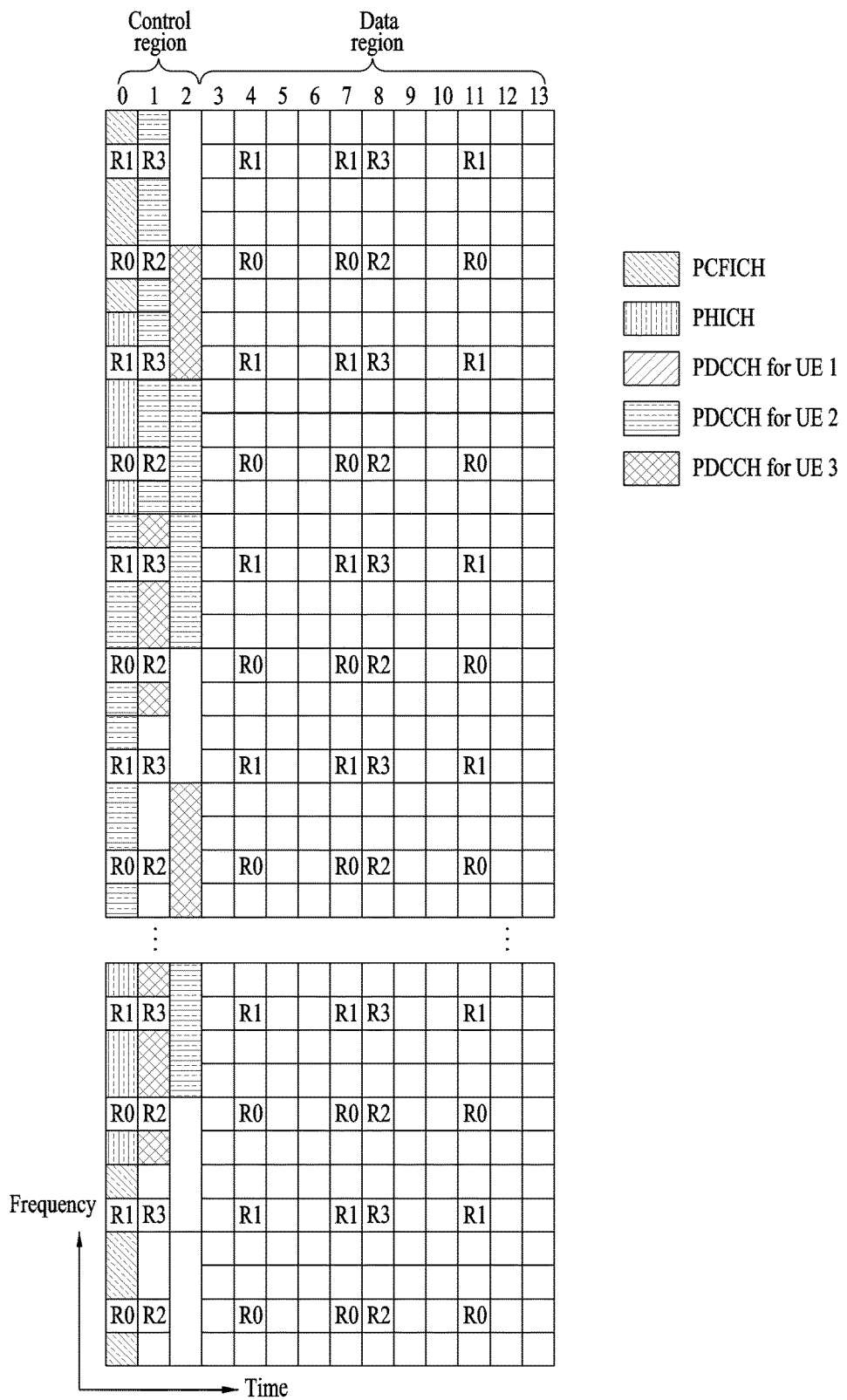
FIG. 3 illustrates the structure of a DL subframe used in a wireless communication system.

FIG. 3 illustrates the structure of a DL subframe used in a LTE/LTE-A based wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE/LTE-A include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH carries a control format indicator (CFI), which indicates any one of values of 1 to 3. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode. The UE may decode a PDSCH in accordance with DCI based on the DCI format successfully decoded. A transmission mode is semi-statically configured for the UE by the upper layer such that the UE may receive PDSCHs transmitted according to one of a plurality of predetermined transmission modes. The UE attempts to decode the PDCCH only in DCI formats corresponding to the transmission mode thereof. For example, tries to decode PDCCH candidates of a UE-specific search space (USS) to a fallback DCI (e.g., DCI format 1A), and tries to decode PDCCH candidates of a common search space (CSS) and the USS to a DCI format specific to a transmission mode with which the UE is configured. In other words, in order to maintain the computational load of the UE according to blind decoding attempts below a certain level, not all DCI formats are simultaneously searched by the UE.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, each CCE contains 9 REGs, which are distributed across the first 1/2/3 (/4 if needed for a 1.4 MHz channel) OFDM symbols and the system bandwidth through interleaving to enable diversity and to mitigate interference. One REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=floor(N_{REG}/9)$. The control region of each serving cell consists of a set of CCEs, numbered from 0 to $N_{CCE,k}-1$, where $N_{CCE,k}$ is the total number of CCEs in the control region of subframe k. A PDCCH consisting of n consecutive CCEs may only start on a CCE fulfilling i mod n=0, where i is the CCE number.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs, where a search space $S^{(L)}_k$ at aggregation level $L \in \{1,2,4,8\}$ is defined by a set of PDCCH candidates. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Transport format information in DCI regarding a PDSCH may be determined using predefined tables. For example, if a DCI CRC is scrambled by a P-RNTI, an RA-RNTI, or an SI-RNTI, a UE may use a modulation order $Q_m$ of 2 and, if not, the UE may use a modulation and coding scheme field $I_{MCS}$ in the DCI and the following table to determine the modulation order $Q_m$ used for the PDSCH. The following table is modulation and transport block size (TBS) index for the PDSCH.

TABLE 1

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |

TABLE 1-continued

| MCS Index $I_{MCS}$ | Modulation Order $Q_m$ | TBS Index $I_{TBS}$ |
|---|---|---|
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Transport format information in DCI regarding a PUSCH may be determined using predefined tables. The following table shows a modulation, transport block size (TBS) index and redundancy version for the PUSCH. The UE uses $I_{MCS}$ and the following table to determine the redundancy version to use in the PUSCH.

TABLE 2

| MCS Index $I_{MCS}$ | Modulation Order $Q'_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |

TABLE 2-continued

| MCS Index $I_{MCS}$ | Modulation Order $Q'_m$ | TBS Index $I_{TBS}$ | Redundancy Version $rv_{idx}$ |
|---|---|---|---|
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

The UE determines the size of a transport block included in the PDSCH/PUSCH based on $I_{TBS}$ and/or information indicating a column of a TBS table included in the DCI. The following table illustrates a part of the TBS table, particularly, for transport blocks not mapped to spatial multiplexing of 2 layers or more.

TABLE 3

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| ... | ... | ... | ... | ... | ... | ... | ... | ... | ... | ... |
| 26 | 712 | 1480 | 2216 | 2984 | 3752 | 4392 | 5160 | 5992 | 6712 | 7480 |

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 0 | 288 | 328 | 344 | 376 | 392 | 424 | 456 | 488 | 504 | 536 |
| ... | ... | ... | ... | ... | ... | ... | ... | ... | ... | ... |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| ... | ... | ... | ... | ... | ... | ... | ... | ... | ... | ... |

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| ... | ... | ... | ... | ... | ... | ... | ... | ... | ... | ... |
| 26 | 75376 | 75376 | 75376 | 75376 | 75376 | 75376 | 75376 | 75376 | 75376 | 75376 |

In addition to the above table, various TBS tables may be defined according to a mapping relationship between transport blocks and layers (refer to Section 7.1.7.2.1 to Section 7.1.7.2.5 of 3GPP TS 36.213 V11.4.0).

Figure 4:
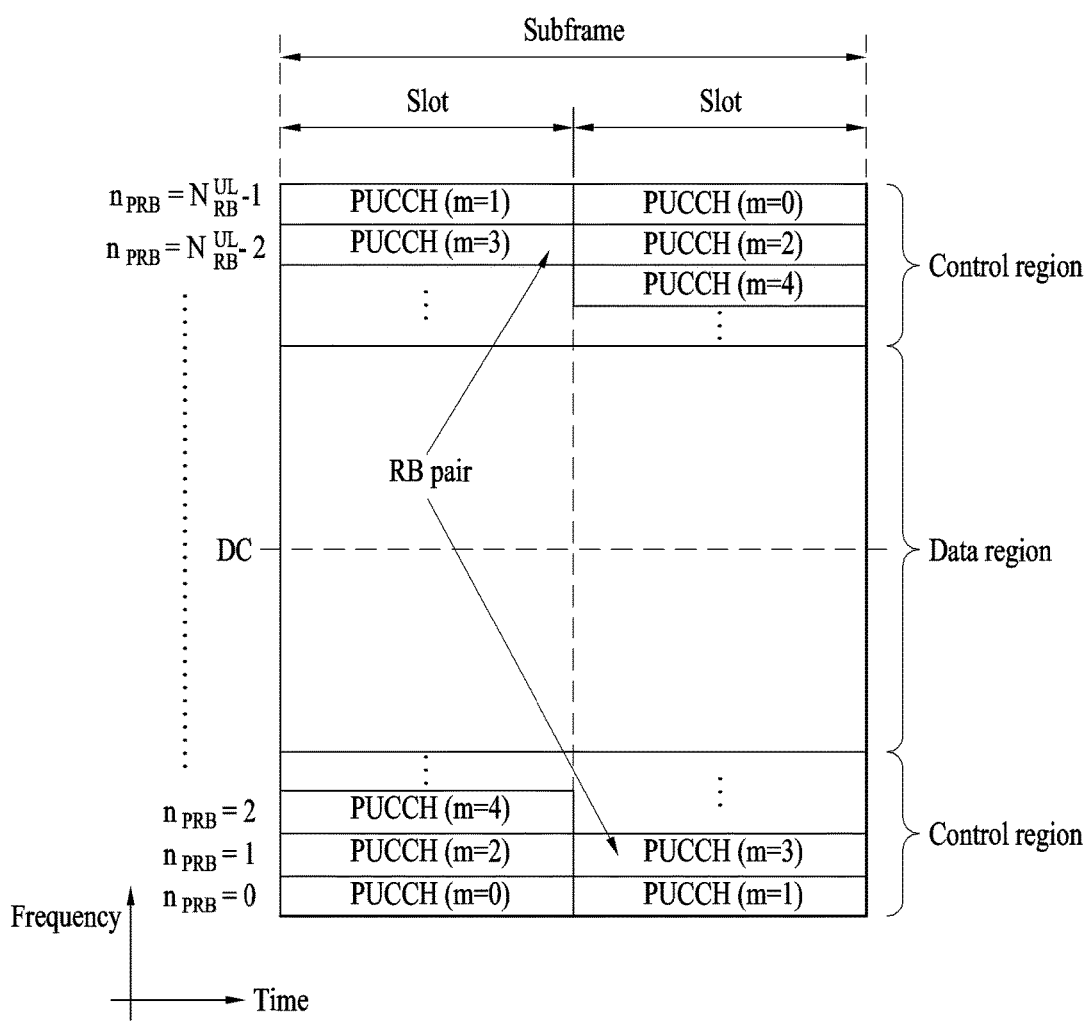
FIG. 4 illustrates the structure of a UL subframe used in a wireless communication system.

FIG. 4 illustrates the structure of a UL subframe used in a LTE/LTE-A based wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH)

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes).

As one method of reducing the cost of an MTC UE, the MTC UE may operate in, for example, a reduced DL and UL bandwidths of 1.4 MHz regardless of the system bandwidth when the cell operates. In this case, a sub-band (i.e., narrowband) in which the MTC UE operates may always be positioned at the center of a cell (e.g., 6 center PRBs), or multiple sub-bands for MTC may be provided in one subframe to multiplex MTC UEs in the subframe such that the UEs use different sub-bands or use the same sub-band which is not a sub-band consisting of the 6 center PRBs.

In this case, the MTC UE may not normally receive a legacy PDCCH transmitted through the entire system bandwidth, and therefore it may not be preferable to transmit a PDCCH for the MTC UE in an OFDM symbol region in which the legacy PDCCH is transmitted, due to an issue of multiplexing with a PDCCH transmitted for another UE. As one method to address this issue, introduction of a control channel transmitted in a sub-band in which MTC operates for the MTC UE is needed. As a DL control channel for such low-complexity MTC UE, a legacy EPDCCH may be used. Alternatively, an M-PDCCH, which is a variant of the legacy PDCCH/EPDCCH, may be introduced for the MTC UE.

A data channel (e.g., PDCCH, PUSCH) and/or control channel (e.g., M-PDCCH, PUCCH, PHICH) may be transmitted across multiple subframes to implement coverage enhancement (CE) of the UE, using a repetition technique or TTI bundling technique. On behalf of the CE, a control/data channel may be transmitted additionally using techniques such as cross-subframe channel estimation and frequency (narrowband) hopping. Herein, the cross-subframe channel estimation refers to a channel estimation technique using not only a reference signal in a subframe having a corresponding channel but also a reference signal in neighboring subframe(s).

The MTC UE may need CE up to, for example, 15 dB. However, not all MTC UEs are present in an environment which requires CE. In addition, the QoS requirements for MTC UEs are not identical. For example, devices such as a sensor and a meter have a low mobility and a small amount of data to transmit/receive and are very likely to be positioned in a shaded area. Accordingly, such devices may need high CE. On the other hand, wearable devices such as a smart watch may have mobility and are very likely to have a relatively large amount of data to transmit/receive and to be positioned in a place other than the shaded area. Accordingly, not all MTC UEs need a high level of CE, and the required capability may depend on the type of an MTC UE.

According to LTE-A Rel-13, CE may be divided into two modes. In a first mode (referred to as CE mode A), transmission may not be repeated or may be repeated only a few times. In a second mode (or CE mode B), many repetitions of transmission are allowed. A mode to enter between the two modes may be signaled to the MTC UE. Herein, parameters that a low-complexity/low-cost UE assumes for transmission/reception of a control channel/data channel may depend on the CE mode. In addition, the DCI format which the low-complexity/low-cost UE monitors may depend on the CE mode. Transmission of some physical channels may be repeated the same number of times regardless of whether the CE mode is CE mode A or CE mode B.

In the next system of LTE-A, a method to reduce latency of data transmission is considered. Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Better latency than previous generations of 3GPP RATs was one performance metric that guided the design of LTE. LTE is also now recognized by the end-users to be a system that provides faster access to internet and lower data latencies than previous generations of mobile radio technologies.

However, with respect to further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps), UE L2 buffers need to be dimensioned correspondingly. The longer the round trip time (RTT) is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher block error ration (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. VoLTE), if keeping the same BLER target. This would improve the VoLTE voice system capacity.

There are more over a number of existing applications that would be positively impacted by reduced latency in terms of increased perceived quality of experience: examples are gaming, real-time applications like VoLTE/OTT VoIP and video telephony/conferencing.

Going into the future, there will be a number of new applications that will be more and more delay critical. Examples include remote control/driving of vehicles, augmented reality applications in e.g. smart glasses, or specific machine communications requiring low latency as well as critical communications.

Figure 5:
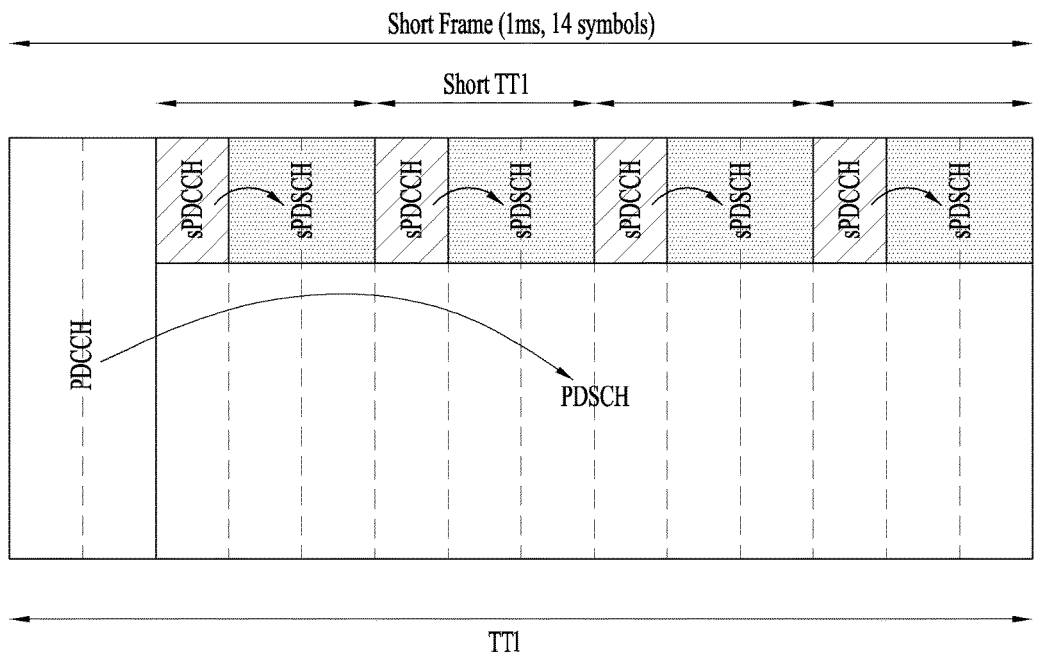
FIG. 5 illustrates an sTTI and transmission of a control channel and data channel within the sTTI.

FIG. 5 illustrates an sTTI and transmission of a control channel and data channel within the sTTI.

To satisfy 1 ms as the OTA delay or U-plane delay, an sTTI shorter than 1 ms may also be configured. For example, for the normal CP, an sTTI consisting of 2 OFDM symbols, an sTTI consisting of 4 OFDM symbols and/or an sTTI consisting of 7 OFDM symbols may be configured.

In the time domain, all OFDM symbols constituting a default TTI or the OFDM symbols except the OFDM symbols occupying the PDCCH region of the TTI may be divided into two or more sTTIs on some or all frequency resources in the frequency band of the default TTI, namely the channel band or system band of the TTI.

In the following description, a default TTI or main TTI used in the system is referred to as a TTI or subframe, and the TTI having a shorter length than the default/main TTI of the system is referred to as an sTTI. For example, in a system in which a TTI of 1 ms is used as the default TTI as in the current LTE/LTE-A system, a TTI shorter than 1 ms may be referred to as the sTTI. In the new RAT environment, the numerology may be changed, and thus a default/main TTI different from that for the current LTE/LTE-A system may be used. However, for simplicity, the default/main TTI will be referred to as a TTI, subframe, legacy TTI or legacy subframe, and a TTI shorter than 1 ms will be referred to as an sTTI, on the assumption that the time length of the default/main TTI is 1 ms. The method of transmitting/receiving a signal in a TTI and an sTTI according to embodiments described below is applicable not only to the system according to the current LTE/LTE-A numerology but also to the default/main TTI and sTTI of the system according to the numerology for the new RAT environment.

In the downlink environment, a PDCCH for transmission/scheduling of data within an sTTI (i.e., sPDCCH) and a PDSCH transmitted within an sTTI (i.e., sPDSCH) may be transmitted. For example, a plurality of the sTTIs may be configured within one subframe, using different OFDM symbols. For example, the OFDM symbols in the subframe may be divided into one or more sTTIs in the time domain. OFDM symbols constituting an sTTI may be configured, excluding the leading OFDM symbols on which the legacy control channel is transmitted. Transmission of the sPDCCH and sPDSCH may be performed in a TDM manner within the sTTI, using different OFDM symbol regions. In an sTTI, the sPDCCH and sPDSCH may be transmitted in an FDM manner, using different regions of PRB(s)/frequency resources.

Embodiments of the present invention described below may be applied to a new radio access technology (RAT) system in addition to the 3GPP LTE/LTE-A system. As more and more communication devices demand larger communication capacity, there is a need for improved mobile broadband communication compared to existing RAT. Also, massive MTC, which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC, and URLLC (Ultra-Reliable and Low Latency Communication), is being discussed. In the present invention, this technology is referred to as new RAT for simplicity.

<OFDM Numerology>

The new RAT system uses an OFDM transmission scheme or a similar transmission scheme. For example, the new RAT system may follow the OFDM parameters defined in the following table.

TABLE 4

| Parameter | Value |
| --- | --- |
| Subcarrier-spacing (Δf) | 75 kHz |
| OFDM symbol length | 13.33 us |
| Cyclic Prefix (CP) length | 1.04 us/0.94 us |
| System BW | 100 MHz |
| No. of available subcarriers | 1200 |
| Subframe length | 0.2 ms |
| Number of OFDM symbol per Subframe | 14 symbols |

<Subframe Structure>

Figure 6:
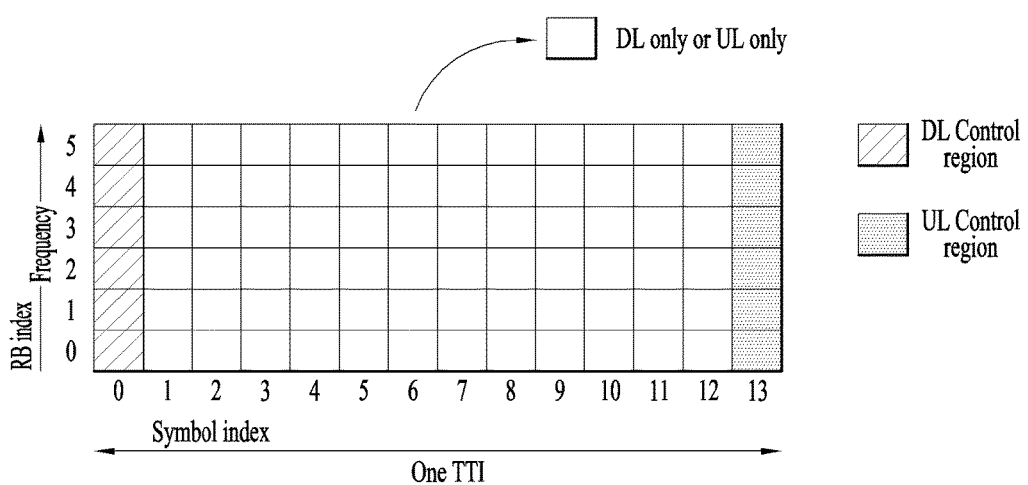
FIG. 6 illustrates a subframe structure available in a new radio access technology system.

FIG. 6 illustrates a subframe structure available in a new radio access technology system.

In order to minimize the latency of data transmission in the TDD system, a subframe structure is considered in the new fifth-generation RAT.

In FIG. 6, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 6, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the subframe structure are set as a guard period (GP).

Referring to FIG. 6, a DL control channel on a wide band may be transmitted by time division multiplexing (TDM) with DL data or UL data. The eNB may transmit the DL control channel(s) over the entire band, but a UE may receive a DL control channel thereof in a specific band rather than the entire band. Here, the DL control channel refers to control information, which includes not only DL specific information such as DL scheduling but also information on cell configuration that the UE should know and UL specific information such as UL grant, transmitted from the eNB to the UE.

For example, a new RAT, referred to as mmWave and 5G, is expected to have a very large system bandwidth. Depending on the frequency band, 5 MHz, 10 MHz, 40 MHz, 80 MHz, etc. may have to be supported as minimum system bandwidth. The minimum system bandwidth may vary depending on the basic subcarrier spacing of the system. For example, when the basic subcarrier spacing is 15 kHz, the minimum system bandwidth is 5 MHz. When the basic subcarrier spacing is 30 kHz, the minimum system bandwidth is 10 MHz. When the basic subcarrier spacing is 120 kHz, the minimum system bandwidth is 40 MHz. When the basic subcarrier spacing is 240 kHz, the minimum system bandwidth may be 80 MHz. The new RAT is designed for sub-6 GHz and bands higher than or equal to 6 GHz and is also designed to support multiple subcarriers within a system to support various scenarios and use cases. When the subcarrier length is changed, the subframe length is also correspondingly reduced/increased. For example, one subframe may be defined as a short time such as 0.5 ms, 0.25 ms, or 0.125 ms. Higher frequency bands (e.g., higher than 6 GHz) may be used in the new RAT system, and a subcarrier spacing wider than the existing subcarrier spacing of 15 kHz in the legacy LTE system is expected to be supported. For example, when the subcarrier spacing is 60 kHz, one resource unit (RU) may be defined by 12 subcarriers on the frequency axis and one subframe on the time axis.

<Analog Beamforming>

In millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ. (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of collection of B TXRUs and Q antenna elements.

Figure 7:
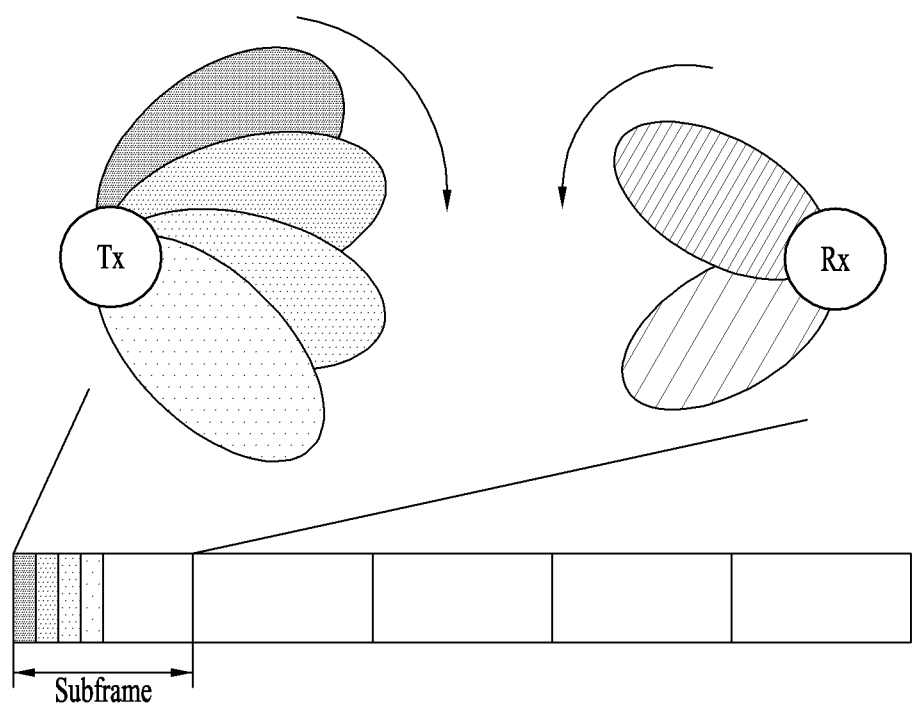
FIG. 7 illustrates an example of application of analog beamforming.

FIG. 7 illustrates an example of application of analog beamforming.

Referring to FIG. 7, a signal may be transmitted/received by changing the direction of a beam over time.

While a non-UE-specific signal (e.g., PSS/SSS/PBCH/SI) is transmitted omni-directionally in the LTE/LTE-A system, a scheme in which an eNB employing mmWave transmits a cell-common signal by omni-directionally changing the beam direction is considered. Transmitting/receiving signals by rotating the beam direction as described above is referred to as beam sweeping or beam scanning.

In the present invention, for convenience of description, a channel over which downlink data is transmitted is referred to as a PDSCH and a channel over which uplink data is transmitted is referred to as a PUSCH. While the present invention is described focusing mainly on a downlink environment (PDSCH transmission) for convenience of description, the present invention is applicable even to an uplink environment (PUSCH transmission).

Figure 8:
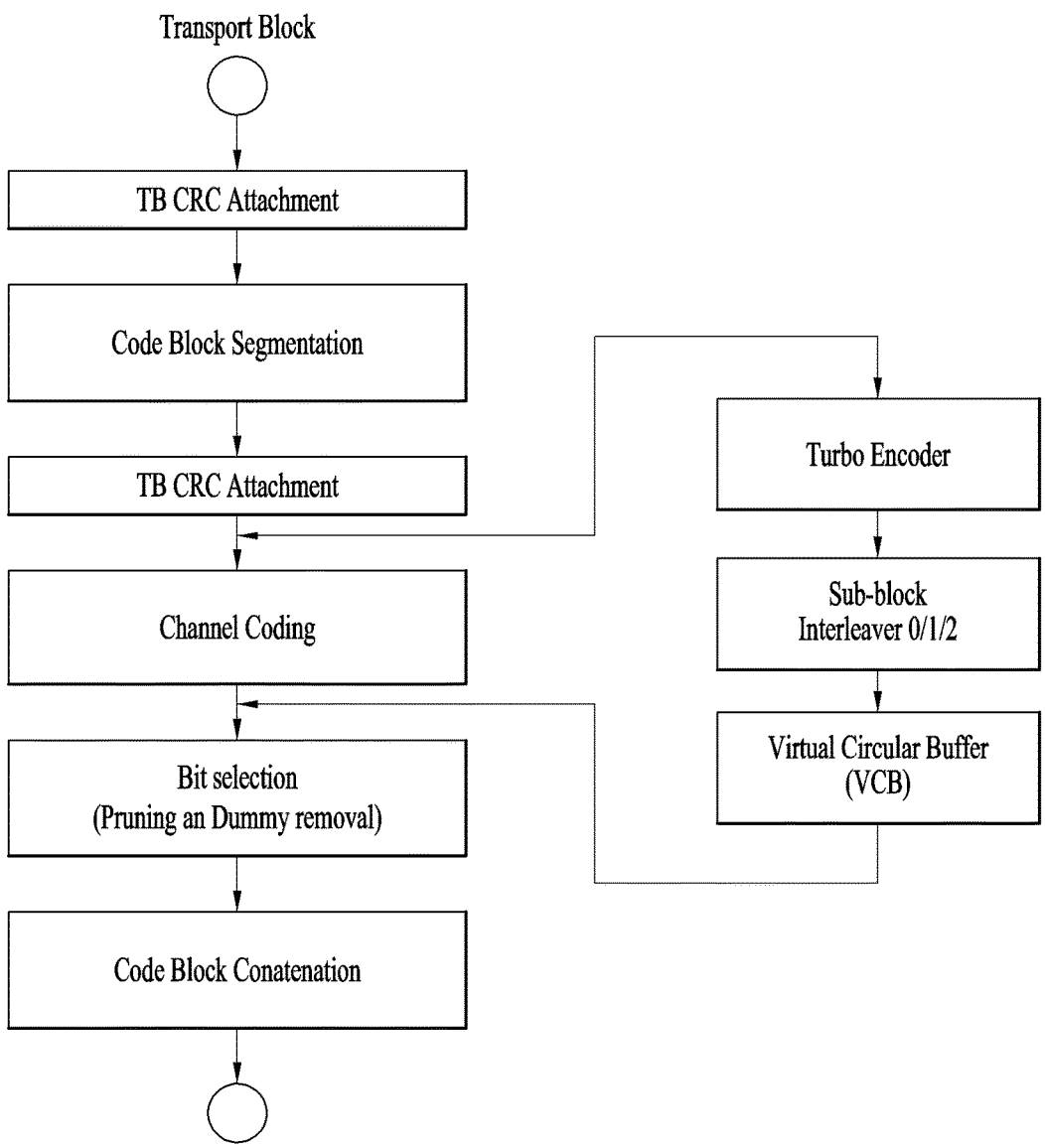
FIG. 8 illustrates an example of a transport block processing in the LTE/LTE-A system.

FIG. 8 illustrates an example of a transport block processing in the LTE/LTE-A system.

Data arrives to the coding unit in the form of a maximum of two transport blocks every transmission time interval (TTI) per DL/UL cell. The following coding steps can be identified for each transport block of a DL/UL cell:

Add CRC to the transport block;
Code block segmentation and code block CRC attachment;
Channel coding;
Rate matching;
Code block concatenation.

The following channel coding schemes can be applied to transport channels (TrCHs): tail biting convolutional coding and Turbo coding. Usage of coding scheme and coding rate for the different types of transport channel is shown in Table 5.

TABLE 5

| TrCH | Coding scheme | Coding rate |
| --- | --- | --- |
| UL-SCH<br>DL-SCH<br>PCH<br>MCH<br>SL-SCH<br>SL-DCH | Turbo coding | 1/3 |
| BCH<br>SL-BCH | Tail biting convolutional coding | 1/3 |

In a typical communication system, a transmitter encodes information using a forward error correction code prior to transmission so that a receiver may correct errors experienced on a channel in a received signal. The receiver recovers the transmitted information by demodulating the received signal and then decoding the forward error correction code. During the decoding, the receiver corrects the channel errors in the received signal. While various types of error correction codes are available, a turbo code will now be described by way of example. The turbo code is implemented by a recursive systematic convolution encoder and an interleaver. For actual implementation of the turbo code, an interleaver is used to facilitate parallel decoding. Quadratic polynomial permutation (QPP) is a kind of interleaving. It is known that a QPP interleaver maintains good performance only in a specific data block size. The turbo code performs better with a larger data block size. In an actual communication system, a data block of a predetermined size or larger is divided into a plurality of smaller data blocks and then is encoded, to facilitate actual implementation of coding. The smaller data blocks are called code blocks. While the code blocks are generally of the same size, one of the code blocks may have a different size due to a limited size of the QPP interleaver. Error correction coding is performed on each code block of a predetermined interleaver size and then interleaving is performed to reduce the impact of burst errors that are generated during transmission over a radio channel. The error-corrected and interleaved code block is transmitted by being mapped to an actual radio resource. The amount of radio resources used for actual transmission is consistent. Thus, the encoded code blocks are rate-matched to the amount of the radio resources. In general, rate matching is performed through puncturing or repetition. Rate matching may be performed on an encoded code block basis as in a 3GPP WCDMA system. In another method, a systematic part and a parity part of the encoded code blocks may be rate-matched separately.

In more detail, in an LTE/LTE-A system, after data to be transmitted is encoded using channel coding having a specific code rate (e.g., ⅓), the code rate of the data to be transmitted is adjusted through a rate-matching procedure consisting of puncturing and repetition. When a turbo code is utilized using a channel code in LTE/LTE-A, a procedure of performing channel coding and rate-matching in a transport channel processing procedure as illustrated in FIG. 8 is illustrated in FIG. 9.

Figure 9:
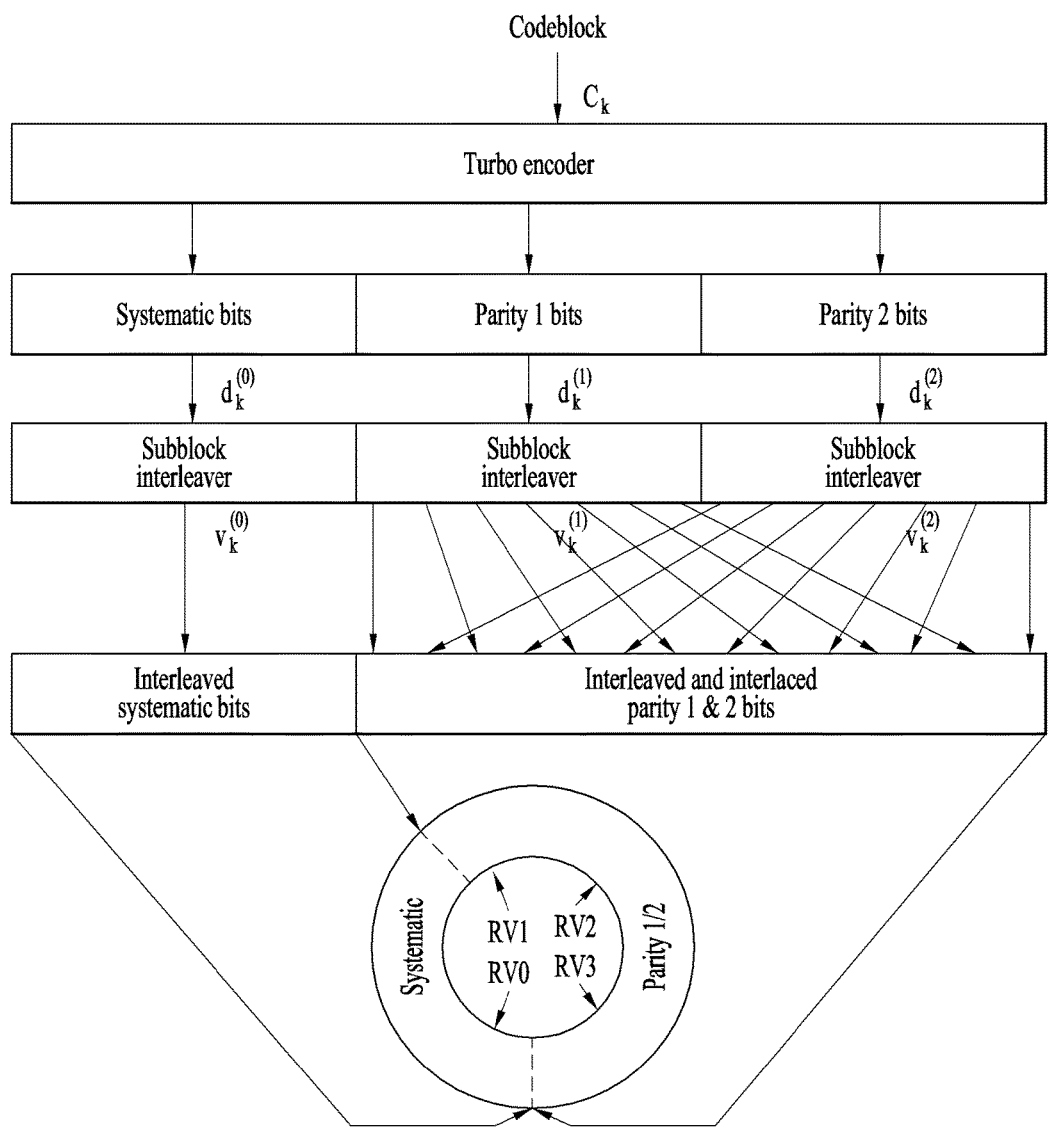
FIG. 9 is a block diagram illustrating rate matching performed by separating an encoded code block into a systematic part and a parity part.

FIG. 9 is a block diagram illustrating rate matching performed by separating an encoded code block into a systematic part and a parity part.

As shown in FIG. 9, the mother code rate of LTE Turbo encoder is ⅓. In order to get other code rates, if desired, repetition or puncturing has to be performed, which both are done by a rate matching module. The rate matching module consists of three so-called sub-block interleavers for the three output streams of the Turbo encoder core and a bit selection and pruning part, which is realized by a circular buffer. The sub-block interleaver is based on the classic row-column interleaver with 32 columns and a length-32 intra-column permutation. The bits of each of the three streams are written row-by-row into a matrix with 32 columns (number of rows depends on the stream size). Dummy bits are padded to the front of each stream to completely fill the matrix. After a column permutation, bits are read out from the matrix column-by-column.

Figure 10:
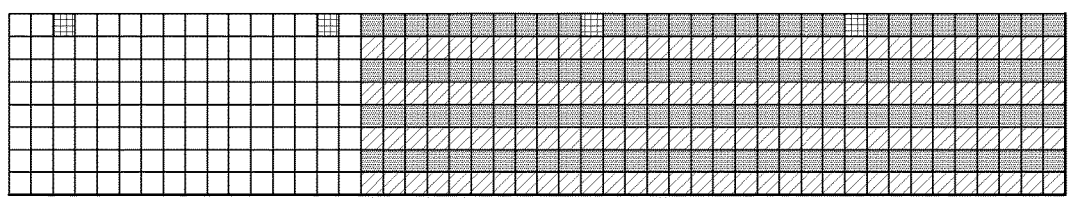
FIG. 10 shows the internal structure of the circular buffer.

FIG. 10 shows the internal structure of the circular buffer.

The circular buffer is the most important part of the rate matching module, making puncturing and repetition of the mother code possible. Referring to FIG. 9, the interleaved systematic bits are written into the circular buffer in sequence, with the first bit of the interleaved systematic bit stream at the beginning of the buffer. The interleaved and interlaced parity bit streams are written into the buffer in sequence, with the first bit of the stream next to the last bit of the interleaved systematic bit stream. The number of coded bits (depending on the code rate), are read out serially from a certain starting point specified by RV points in the buffer. If the end of the buffer is reached and more coded bits are needed for the transmission (in the case of a code rate smaller than ⅓), the transmitter wraps around and continues at the beginning of the buffer.

HARQ, which stands for Hybrid ARQ, is an error correction mechanism in LTE based on retransmission of packets, which are detected with error. The transmitted packet arrives after a certain propagation delay in a receiver. The receiver produces either an ACK for the case of error-free transmission or a NACK, if some errors are detected. The ACK/NACK is produced after some processing time and sent back to transmitter and arrives there after a propagation delay. In the case of a NACK, after a certain processing delay in a transmitter, the desired packet will be sent again. The bits, which are read out from the circular buffer and sent in each retransmission are different and depend on the position of the RV (Redundancy Version). There are four RVs (0, 1, 2, 3), which define the position of the starting point, where the bits are read out from the circular buffer. Referring to FIG. 10, in the first retransmission, more systematic bits are sent and with the progressing number of retransmissions, RV becomes higher and therefore less systematic and more parity bits are read out from the circular buffer for the retransmission.

In a new RAT environment, channel codes (e.g., LDPC code, polar code, etc.) other than the turbo code may be applied. Even if the turbo code or other codes are applied, an independent channel code may be applied to each of a plurality of code rates. For example, only a mother code for a code rate of ⅓ is defined in the turbo code in the legacy LTE/LTE-A system, whereas a mother code for each of various code rates may be applied in new RAT. This is because performing channel encoding using a channel code optimized for a code rate R2 can generally obtain better performance in the code rate R2 than performing a puncturing/repetition procedure to obtain the code rate R2, after channel encoding is performed using a channel code for a specific code rate R1.

Therefore, data transmission and reception using a different channel code according to a desired code rate may be considered in the new RAT system. The present invention proposes a method of selecting code rates of channel codes and a method of solving additional issues, when data is transmitted/received using a different channel code according to a desired code rate of the data in the new RAT environment.

While the present invention is described focusing mainly on data transmission, the present invention may also be applied to control channel transmission in addition to data channel transmission.

Hereinbelow, a code rate R_C of a channel code refers to the ratio between input data and output data of channel code encoding. In other words, the code rate R_C may mean a value obtained by dividing the number I of input bits (information bits) by the number O of output bits (encoded bits) in an encoding procedure of the channel code, i.e., R_C=I/O. That is, the code rate R_C may mean a value obtained by dividing the number of information bits by (the number of information bits+the number of parity bits) in a channel coding procedure. R_C may correspond to the concept of a mother code rate in current LTE/LTE-A standards.

Hereinbelow, a code rate R_D of data may refer to a code rate at which data is desired to be transmitted or a code rate at which data is transmitted. The code rate R_D of data may mean a value obtained by dividing the number I of information bits by the number T of bits transmitted through a transmission resource, i.e., I/T. The number of bits transmitted through the transmission resource may mean the number of bits transmitted through an actual transmission resource or the number of bits expected/targeted to be transmitted through the transmission resource.

Hereinbelow, the number of output bits (i.e., encoded bits) produced as a result of channel encoding is referred to as N_C and the number of bits transmitted through an actual transmission resource is referred to as N_R. Herein, the value of N_R may be different from the number of bits transmitted through a transmission resource calculated by the code rate R_D of data.

In this case, the value of N_C may be same as the value of N_R but they may be different. Herein, N_R transmission bits may be obtained from N_C output bits through a rate-matching procedure. For example, the rate-matching procedure may be as follows.

If the value of N_C is greater than the value of N_R, the N_R transmission bits may be acquired by puncturing a part of systematic bits and/or parity bits of the N_C output bits.

If the value of N_C is less than the value of N_R, the N_R transmission bits may be acquired by repeating all or a part of the systematic bits and/or parity bits of the N_C output bits. Alternatively or additionally, the N_R transmission bits may be acquired by generating additional parity bits through an additional encoding procedure.

<A. Code Rate Determination Method of Channel Code>

When there are respective channel codes for different code rates, it is necessary to determine a code rate of a channel code performing channel encoding/decoding on data. That is, it is necessary to determine which data and which channel code are to be used to perform encoding or decoding.

Figure 11:
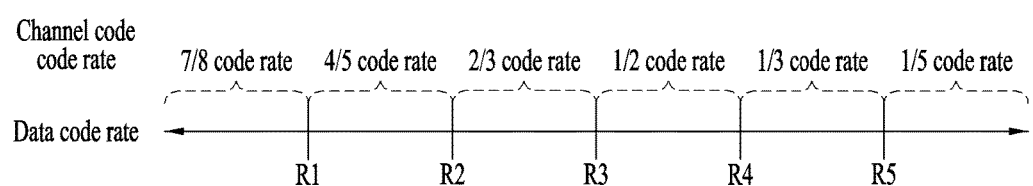
FIG. 11 illustrates the relationship between a transmission code rate of data and a code rate of a channel code.

FIG. 11 illustrates the relationship between a transmission code rate of data and a code rate of a channel code.

An effective code rate of data may be finely changed according to a TBS of the data, the amount of transmission resources of data, and the like, whereas it is not possible to apply different channel codes to all code rates at which data can be transmitted. For example, as illustrated in FIG. 11, a code rate (i.e., R_C) of a channel code applied to data may be determined according to a transmission code rate (i.e., R_D) of data. In this case, a channel code having the same code rate may be applied to data having code rates within a specific range. More specifically, the code rate R_C of a channel code may be determined using the following methods.

- Method 1. A code rate R_C of a channel code having a value closest to a transmission code rate R_D of data may be applied. In this case, a channel code having R_C closest to R_D may be applied.
- Method 2. A code rate R_C of a channel code closest to a transmission code rate R_D of data among code rates R_C of channel codes having values greater than the transmission code rate R_D of data may be applied. In this case, a channel code having R_C which is greater than or equal to R_D and closest to R_D may be applied. This scheme may make it possible to generate transmission bits by applying minimum repetition to output bits of the selected channel code. Alternatively, a code rate R_C of a channel code closest to the transmission code rate R_D of data among code rates R_C of channel codes having values less than the transmission code rate R_D of data may be applied. This scheme may make it possible to generate transmission bits by applying minimum puncturing to output bits of the selected channel code. For reference, selection of R_C greater than R_D requires a smaller buffer size than selection of R_C less than R_D. Method 2 has an advantage of minimizing a HARQ reception buffer as compared with Method 3 and Method 4.
- Method 3. A code rate R_C of a channel code having a value closest to a function f(R_D) of a transmission code rate R_D of data may be applied. Accordingly, a channel code of R_C having a value closest to f(R_D) may be applied. Alternatively, a code rate R_C of a channel code having a value which is greater than or equal to the function f(R_D) of the transmission code rate R_D of data and closest to the function f(R_D) may be applied. In this case, a channel code having R_C which is greater than or equal to f(R_D) and closest to f(R_D) may be applied. Alternatively, a code rate R_C of a channel code having a value which is less than or equal to the function f(R_D) of the transmission code rate R_D of data and closest to the function f(R_D) may be applied. In this case, a channel code having R_C which is less than or equal to f(R_D) and closest to f(R_D) may be applied. For example, in Method 3, f(x) may be equal to x+α. If α is set to a negative value, a code rate of a selected channel code may be lowered. A scheme of setting α to a negative value may cause performance enhancement because non-overlapping parity bits may be additionally transmitted upon retransmission.
- Method 4. A code rate R_C of a channel code, a value of a function f(R_C) of which is closest to a function f(R_D) of a transmission code rate R_D of data, may be applied. Accordingly, a channel code having f(R_C) of a value closest to f(R_D) may be applied. A code rate R_C of a channel code, a value of F(R_C) of which is greater than or equal to the function f(R_D) of the transmission code rate R_D of data and closest to the function f(R_D), may be applied. In this case, a channel code having f(R_C) which is greater than or equal to f(R_D) and closest to f(R_D) may be applied. A code rate R_C of a channel code, a value of F(R_C) of which is less than or equal to the function f(R_D) of the transmission code rate R_D of data and closest to the function f(R_D), may be applied. In this case, a channel code having f(R_C) which is less than or equal to f(R_D) and closest to f(R_D) may be applied. For example, in Method 4, f(x) may be equal to 1/x or α/x. If α is set to a real number greater than 1, a code rate of a selected channel code may be lowered. A scheme of setting α to a real number greater than 1 may cause performance enhancement because non-overlapping parity bits may be additionally transmitted upon retransmission.
- Method 5. A code rate R_C of a channel code applied to data transmission through DCI may be configured through the DCI. A UE is informed of the value of R_C through an explicit field of the DCI or through an MCS field. If the UE is informed of the value of R_C through the MCS field, a value of R_C matched according to, for example, an MCS field index may be present.

Meanwhile, a transmission code rate R_D of data may be determined as follows.

- Method a. The transmission code rate of data may be determined according to configuration by an eNB. For example, the eNB may configure R_D through DCI and inform the UE of the value of R_D through an explicit field of the DCI or through an MCS field. Although DCI of a legacy LTE/LTE system includes the legacy MCS field, the concept of a target code per MCS is not present in the MCS field of the legacy system. On the other hand, in the present invention, if a network or the eNB informs the UE of R_D through the MCS field, the value of R_D matched according to, for example, an MCS field index may be present or may be defined. The value of R_D may be a value determined (calculated) by a data transmission PRB size, a TBS, and/or a modulation order, configured by the eNB. In Method a, there is almost no possibility that ambiguity occurs between the eNB and the UE because the value of R_D is explicitly or implicitly known through the DCI. However, when the number of REs usable for data transmission is changed due to control channel and RS transmission, there is a difference between R_D and an effective code rate during actual transmission and thus a problem may occur in selecting a proper channel code.
- Method b. The transmission code rate of data may be a value determined or calculated according to a TBS, a data transmission PRB size, a modulation order, and/or the number of data transmission OFDM symbols. For example, the value of R_D may be defined as a value obtained by dividing the TBS by ((PRB size)*(number of REs in PRB)*(modulation order)*(value obtained by dividing number of data transmission OFDM symbols by number of OFDM symbols in subframe)). Simply, in Method b, R_D is calculated in consideration of only the number of OFDM symbols used for data transmission. This method reduces the possibility of generating ambiguity between the eNB and the UE because the number of REs used for actual data transmission is not considered.
- Method c. The transmission code rate of data may be a value determined or calculated according to a TBS, a modulation order, and/or the amount of data transmission resources (e.g., number of REs). For example, the value of R_D may be defined as a value obtained by dividing the TBS by ((number of data transmission REs)*(modulation order)). In this case, the amount of data transmission resources (e.g., number of REs) may mean the number of REs on which data is actually transmitted in a data transmission PRB region. Alternatively, the amount of data transmission resources (e.g., number of REs) may mean the number of REs except for a data non-transmission OFDM symbol region, a CRS transmission RE region, and/or a DMRS transmission RE region, in the data transmission PRB region. In Method c, R_D can accurately factor in an effective code rate for actual transmission even when the number of REs usable for data transmission is changed due to control channel and RS transmission.

When the transmission code rate R_D of data is less than the code rate R_C of a channel code, the transmission code rate of data may be matched by repeating data or generating additional parity bits. On the other hand, when the transmission code rate R_D of data is greater than the code rate R_C of a channel code, the transmission code rate of the data may be matched by puncturing data.

<B. Redundancy Version>

When separate channel codes for a plurality of code rates are present, for example, when a mother code is defined per code rate, a code rate R_C of a channel code may be determined as a value closest to a code rate R_D at which data is transmitted, according to the present invention. Since the number of redundancy versions (RVs) is associated with a maximum value of the ratio between R_D and R_C (i.e., R_D/R_C), 4 RVs as needed conventionally may not be necessary according to the present invention. Notably, in consideration of an environment in which the amount of transmission resources of data varies during every retransmission, two RV values may be defined and used.

Alternatively, the code rate R_C of a channel code and the transmission code rate R_D of data may be independently determined. Herein, generally, if the code rate of a channel code is greater than the code rate R_D of data, since the amount of data to be transmitted is relatively smaller than the amount of information, many RV values may not be needed. If the code rate of a channel code is less than the code rate R_D of data, since the amount of data is relatively larger than the amount of information, many RV values may be necessary.

Accordingly, the present invention proposes that the number of RVs be different according to the code rate R_C of a channel code. For example, the number of RVs may be configured to increase as the code rate of a channel code decreases.

Alternatively, the present invention proposes that number of RVs be different according to the ratio between the code rate R_C of a channel code and the code rate R_D of data. For example, the number of RVs may be configured to increase as a value obtained by dividing R_D by R_C, i.e., R_D/R_C, increases.

Figure 12:
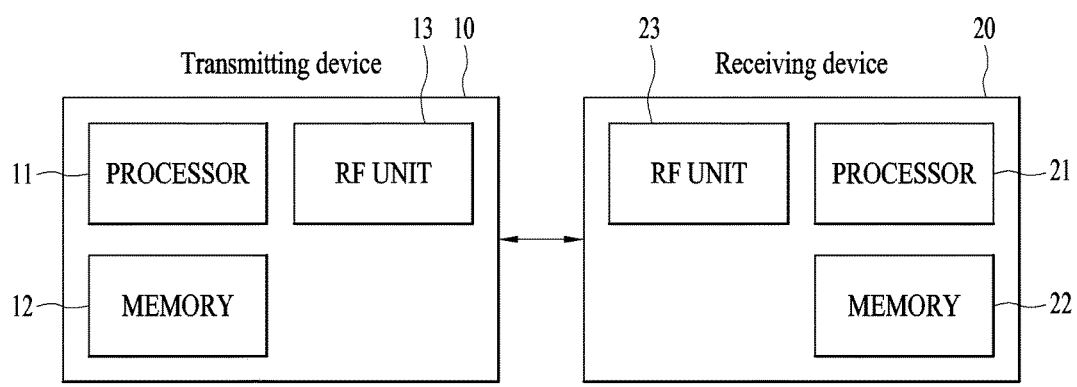
FIG. 12 is a block diagram illustrating elements of a transmitting device 10 and a receiving device 20 for implementing the present invention.

FIG. 12 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

In NR, a channel code, i.e., a mother code, may be defined per a few channel code rates. The UE processor may determine a channel code rate R_C to be applied to channel coding of UL data to be transmitted or channel decoding of received DL data, according to Method 1, Method 2, Method 3, Method 4, or Method 5 described in Section A, based on a transmission code rate R_D of corresponding data. The UE processor may channel-code the UL data or channel-decode the DL data, using a channel code corresponding to R_C. The UE processor may calculate or recognize R_D according to Method a, Method b, or Method c described in Section A. The UE RF unit may receive channel-coded DL data. The UE RF unit may transmit channel-coded UL data. The UE processor may decode the DL data using an RV applied to the received DL data. The UE processor may apply an RV to the UL data to be transmitted. As described in Section B, the number of available RVs may differ according to the code rate of the channel code.

The eNB processor may determine a channel code rate R_C to be applied to channel decoding of received UL data or channel coding of DL data to be transmitted, according to Method 1, Method 2, Method 3, Method 4, or Method 5 described in Section A, based on a transmission code rate R_D of corresponding data. The eNB processor may channel-decode the UL data or channel-code the DL data, using a channel code corresponding to R_C. The eNB processor may control the eNB RF unit to transmit information directly or indirectly indicating R_D according to Method a, Method b, or Method c described in Section A. The eNB RF unit may transmit channel-coded DL data. The eNB RF unit may receive channel-coded UL data. The eNB processor may apply an RV to the DL data to be transmitted. The eNB processor may decode the UL data using an RV of the received UL data. As described in Section B, the number of available RVs may differ according to the code rate of the channel code.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method for transmitting uplink data by a user equipment in a wireless communication system, the method comprising:
   receiving, by the user equipment, downlink control information including information on a target code rate for the uplink data;
   determining, by the user equipment, a channel code among a plurality of channel codes based on the target code rate;
   encoding, by the user equipment, the uplink data based on the determined channel code; and
   transmitting, by the user equipment, the encoded uplink data,
   wherein the plurality of channel codes have different channel code rates, respectively, and each of the channel code rates is related to a ratio between a number of information bits for a corresponding channel code and a number of output bits for the corresponding channel code.

2. The method according to claim 1, further comprising:
   applying, to the encoded uplink data by the user equipment, a redundancy version among a plurality of redundancy versions; and
   transmitting, by the user equipment, the encoded uplink data having the redundancy version,
   wherein there are different number of redundancy versions for different channel code rates, respectively, and
   wherein a number of redundancy versions for a low channel code rate is larger than that for a high channel code rate.

3. The method according to claim 1,
   wherein the plurality of channel codes support different ranges of code rates, respectively.

4. The method according to claim 1,
   wherein the information on the target code rate is information indicating one among a plurality of modulation and coding scheme (MCS) indexes, and
   wherein the plurality of MCS indexes have a plurality of code rates, respectively.

5. The method according to claim 4,
   wherein each of the plurality of code rates is related to a ratio between a number of information bits and a number of bits transmitted.

6. The method according to claim 1, further comprising:
   matching a code rate of the uplink data to the target code rate by repeating a whole or part of the encoded uplink data or puncturing a part of the encoded uplink data,
   wherein the code rate of the uplink data is determined based on a transport block size for the uplink data, a modulation order for the uplink data and a number of resource blocks for the uplink data.

7. A user equipment for transmitting uplink data in a wireless communication system, the user equipment comprising:
   a transceiver; and
   a processor configured to:
      control the transceiver to receive downlink control information including information on a target code rate for the uplink data,
      determine a channel code among a plurality of channel codes based on the target code rate,
      encode the uplink data based on the determined channel code, and control the transceiver to transmit the encoded uplink data, wherein the plurality of channel codes have different channel code rates, respectively, and each of the channel code rates is related to a ratio between a number of information bits for a corresponding channel code and a number of output bits for the corresponding channel code.

8. The user equipment according to claim 7, wherein the processor is further configured to:

apply, to the encoded uplink data, a redundancy version among a plurality of redundancy versions, and control the transceiver to retransmit the encoded uplink data having the redundancy version, wherein there are different number of redundancy versions for different channel code rates, respectively, and wherein a number of redundancy versions for a low channel code rate is larger than that for a high channel code rate.

9. The user equipment according to claim 7, wherein the plurality of channel codes support different ranges of code rates, respectively.

10. The user equipment according to claim 7, wherein the information on the target code rate is information indicating one among a plurality of modulation and coding scheme (MCS) indexes, and wherein the plurality of MCS indexes have a plurality of code rates, respectively.

11. The user equipment according to claim 10, wherein each of the plurality of code rates is related to a ratio between a number of information bits and a number of bits transmitted.

12. The user equipment according to claim 7, wherein the processor is further configured to:

match a code rate of the uplink data to the target code rate by repeating a whole or part of the encoded uplink data or puncturing a part of the encoded uplink data, wherein the code rate of the uplink data is determined based on a transport block size for the uplink data, a modulation order for the uplink data and a number of resource blocks for the uplink data.

13. A method for receiving uplink data by a base station in a wireless communication system, the method comprising:

transmitting, by the base station, downlink control information including information on a target code rate for the uplink data to a user equipment;

receiving, by the base station, encoded uplink data from the user equipment;

determining, by the base station, a channel code among a plurality of channel codes based on the target code rate; and decoding, by the base station, the encoded uplink data into the uplink data based on the determined channel code, wherein the plurality of channel codes have different channel code rates, respectively, and each of the channel code rates is related to a ratio between a number of information bits for a corresponding channel code and a number of output bits for the corresponding channel code.

14. A base station for receiving uplink data in a wireless communication system, the base station comprising:

a transceiver; and a processor configured to:

control the transceiver to transmit downlink control information including information on a target code rate for the uplink data to a user equipment, control the transceiver to receive encoded uplink data from the user equipment, determine a channel code among a plurality of channel codes based on the target code rate, and decode the encoded uplink data into the uplink data based on the determined channel code, wherein the plurality of channel codes have different channel code rates, respectively, and each of the channel code rates is related to a ratio between a number of information bits for a corresponding channel code and a number of output bits for the corresponding channel code.

* * * * *